United States Patent [19]

D'Intino

[11] 4,185,526

[45] Jan. 29, 1980

[54] HOLDER FOR CIRCULAR FABRIC CUTTER

[76] Inventor: Vito D'Intino, 4710 Central Ave., Sea Isle City, N.J. 08243

[21] Appl. No.: 894,893

[22] Filed: Apr. 10, 1978

[51] Int. Cl.² .................. B23B 25/00; B23B 5/22; B26B 3/00
[52] U.S. Cl. ........................ 82/44; 279/2 R; 30/301
[58] Field of Search .......... 82/46 R, 46 A, 44; 279/23, 41, 42, 43, 47, 96, 120, 2; 30/130, 300, 301, 316; 83/698

[56] References Cited

U.S. PATENT DOCUMENTS

| | | | |
|---|---|---|---|
| 1,648,032 | 11/1927 | Starkin | 82/44 |
| 2,435,480 | 2/1948 | Tuttle | 279/2 |
| 2,573,928 | 11/1951 | Peter | 279/2 |
| 2,674,026 | 4/1954 | St. Palley | 279/2 |
| 2,868,548 | 1/1959 | Lappin et al. | 279/2 |
| 3,130,978 | 4/1964 | Van Roojen | 82/44 |
| 3,171,200 | 3/1965 | Poppenga | 30/301 |
| 3,360,276 | 12/1967 | Peffer | 279/2 |
| 3,709,546 | 1/1973 | Vaughn | 279/2 |

*Primary Examiner*—Harrison L. Hinson
*Attorney, Agent, or Firm*—James Albert Drobile

[57] ABSTRACT

The branches of a furcated cylinder are splayed by a tapered plug inserted therebetween. To securely hold a circular fabric cutter in concentricity with the cylinder, the branches or fingers are placed within the cutter and then driven apart by further insertion of the tapered plug. One end of the cylinder is suited for connection with a rotating chuck. Interchangeable plugs facilitate the holding of various sizes of cutters.

1 Claim, 8 Drawing Figures

HOLDER FOR CIRCULAR FABRIC CUTTER

BACKGROUND OF THE INVENTION

The present invention relates to the field of fabric cutters and more particularly to a device to grasp circular fabric cutters during the process of sharpening. In producing cloth-covered buttons, which are frequently required in dress-making and furniture upholstering, a preliminary step requires that a circular patch be cut from the desired fabric. Cutting is accomplished by using a thin-walled, cylindrical metal tube which has its circumference tapered at one end to form a circular cutting edge. By pressing and turning the cutting edge into the fabric, a circular cloth patch is produced. Unfortunately, both cutting of the fabric, and also inadvertent engagement of the cutting edge with the solid surface which backs the fabric during cutting, causes rapid dulling of the cutting edge. In a machine shop the cutter may be readily resharpened, for example, by mounting in a lathe chuck and dressing the cutting edge with a grinding stone. However, in a small garment or upholstering shop, and especially in multitudes of homes and classrooms where do-it yourself sewing advocates are busily engaged, the machinery and skill necessary to resharpen the circular patch cutters are absent. Accordingly, undesirable delay, and expenses, inordinately high in relation to the effort underway, are incurred in seeking out suitable skills and facilities to resharpen cutters.

A major difficulty facing a would-be cutter sharpener is that person's inability to firmly hold the cutter in a manner which assures rapid and concentric sharpening.

What is needed is a device which can be used in small shops and in the home to properly and safely hold the circular fabric cutters and enable resharpening.

SUMMARY OF THE INVENTION

The cutter holder of this invention comprises a thin-walled metal cylinder which is partially split longitudinally to provide a plurality of resilient fingers or branches extending symetrically from a common circular base. A coaxial shaft extends at both ends from the cylinder and is integral with the circular base. A circular plug located between the fingers and translatable along the shaft forces the fingers elastically apart, the degree of separation being dependent upon the position of the plug. In use, a circular cutter is slipped concentrically around the fingers; the plug is then driven toward the circular base until the circle of fingers expands sufficiently to internally grip the cutter. The holder is then mounted for rotation by insertion into a chuck.

An object of this invention is to provide a holder for circular cutters which holds a cutter in a concentric condition for sharpening.

Another object of this invention is to provide a holder which is simple in construction and is suited to use by relatively unskilled operators without need for substantial anxiliary equipment.

Yet another object of this invention is to provide a cutter holder which is safe to use.

Still another object of this invention is to provide a holder which is readily modified to operate on various sizes of cutters.

Other objects, advantages and novel features of the present invention will become apparent from the following detailed description of the invention when considered in conjunction with the accompanying drawing in which.

Figure 1:
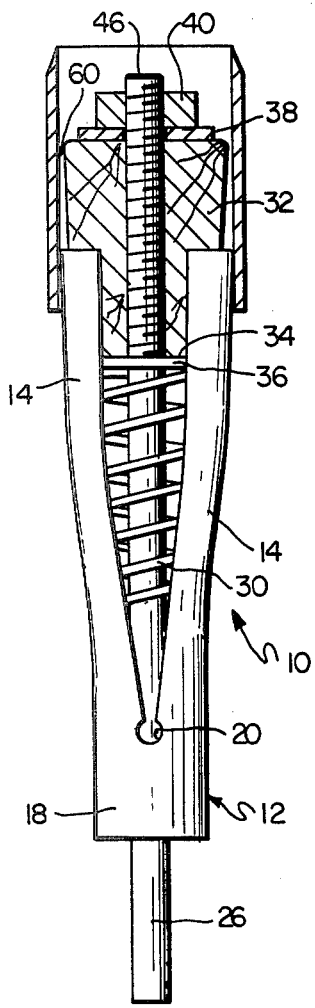
FIG. 1 is a front elevation view of one preferred embodiment of the cutter holder of this invention.
Figure 2:
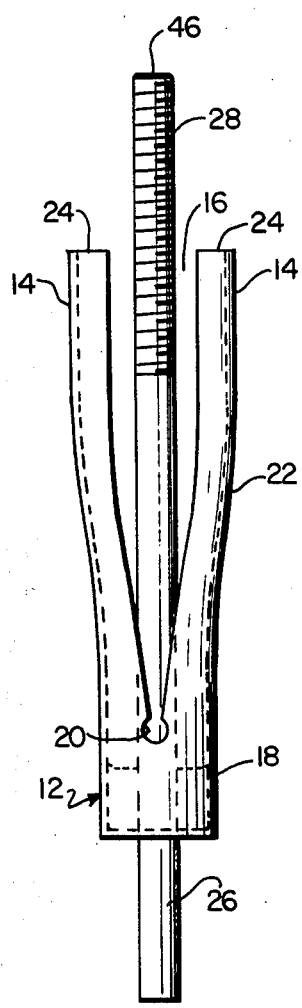
FIGS. 2, 3 and 4 are the front elevation, top and bottom views respectively of the cylinder and shaft assembly of the holder of FIG. 1.
Figure 3:
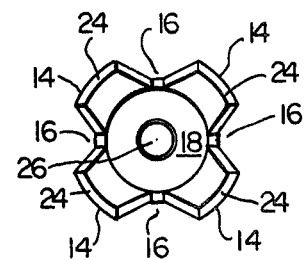
Figure 4:
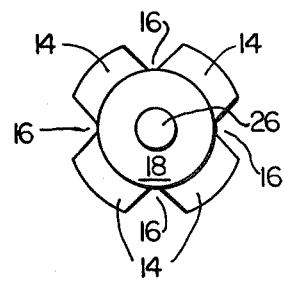
Figure 5:
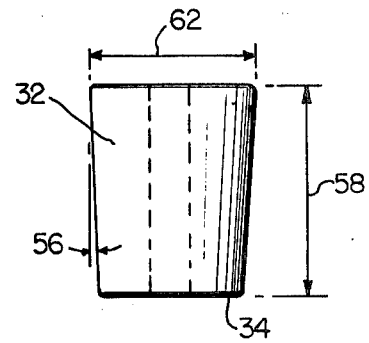
FIG. 5 is an insertible plug used with the cutter holder of FIG. 1.

With reference to FIG. 1, the cutter holder 10 of this invention is comprised of a thin-walled hollow cylinder 12 (FIGS. 2,3,4) which has been split symetrically and longitudinally into four branches or fingers 14. The fingers 14 extend in length in the order of three-quarters of the length of the cylinder 12 and are spread apart, one finger 14 from the other finger 14, leaving generally triangular open notches 16 therebetween. The cylinder is fabricated of a tough but flexible material e.g. stainless steel, and is permanently deformed in manufacture near the base 18 to maintain separation between the fingers 14 as described above. The fingers 14 are resiliently flexible and undergo elastic flexure when the cutter holder 10 is used; accordingly stress relief holes 20 are provided at the lower intersections of the fingers 14 to prevent elongation of the notches 16 and material failure during flexing. The fingers 14 extend from the cylinder base 18 initially spreading apart conically; at approximately the midpoint 22 in length of the fingers 14, the fingers are contoured to be segments of a generally cylindrical surface extending between said midpoint 22 and the outer extremities 24 of the fingers 14.

An elongated circular shaft 26 passes concentrically through the cylinder 12 and extends beyond the base 18 and finger tips 24. The shaft 26 at its lower extremity (FIGS. 1, 2) is smooth or otherwsie suited for connection to a rotating chuck, and is integrally and rigidly joined to the cylinder base 18. The other end 28 of the shaft 26 is threaded.

The cutter holder 10 of this invention further comprises an elongated spiral compression spring 30 which fits between the fingers 14 and concentrically around the shaft 26. A truncated conical wooden plug 32, also fits between the fingers 14 and concentrically around the shaft 26. The narrower end 34 of the plug 32 is adjacent the spring 30 and separated therefrom by the bearing washer 36. A second washer 38 rests atop the plug 32 and a hex nut 40 is threaded onto the shaft 26. The diameters of the plug 32 exceed the diameter of the base 18 assuring that the fingers 14 are spread apart.

Figure 6:
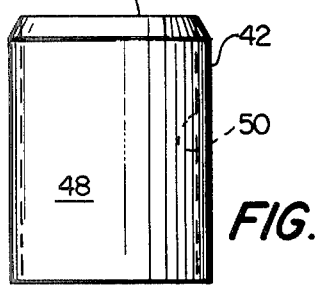
FIGS. 6 and 7 are elevation and top views respectively of a fabric cutter for preparing circular patches.
Figure 7:
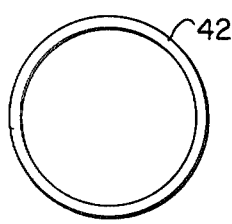

A fabric cutter 42 of the type which is to be held for sharpening by the holder 10 of this invention is illustrated in FIGS. 6 and 7. The cutter 42 is a thin-walled metal cylinder having the outside surface circumferentially tapered at one end 44 to provide a sharp cutting edge.

The procedure used to hold a cutter 42 with the holder 10 of this invention is as follows.

The hex nut 40 is backed off along the threaded shaft 26 to a position near the far end 46. The compression spring 30 drives the plug 32 upward along the shaft 26 against the washer 38 and nut 40 allowing the fingers 14 to move inward toward the shaft 26 and assume an unflexed condition. Next the fingers 14 and plug 32 are inserted within the opening 48 of the cutter 42, the tapered cutting edge extending clear of the plug 32

Figure 8:
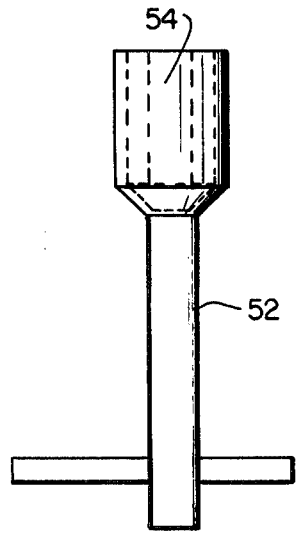
FIG. 8 is a T-wrench used with the holder of FIG. 1.

(FIG. 1). Then the nut 40 is threaded along the shaft 26 toward the base 18, compressing the spring 30 and driving the plug 32 downward between the fingers 14 until the fingers 14 are flexed outwardly to contact the inner wall 50 of the cutter 42. Continued threading of the nut 40 rigidizes the grip of the fingers 14 on the cutter 42. Threading of the nut 40 is facilitated by using a T-wrench 52 (FIG. 8) having a mating hexagonal socket 54. The taper angle 56 and length 58 of the plug 32 provide a clearance 60 between the plug 32 and the cutter wall 50 when the cutter 42 is in the grip of the holder 10.

The holder 10 with the attached cutter 42 is then placed in the chuck of a drill press or hand drill (not shown) and rotated while a sharpening stone (not shown) or other suitable sharping tool is applied to the tapered cutter edge. The sharpened cutter 42 is released from the holder 10, by threading the nut 40 away from the cylinder base 18 thereby relaxing the force which drives the fingers 14 outwardly. The cutter is then pulled off the fingers 14 and separates from the holder 10.

Cutters of widely different diameters are held in the holder 10 by using plugs 32 of different matching diameters 62. However, an intermediate range of cutter diameters is accomodated with a single plug merely by adjustment of the nut setting along the threaded portion of the shaft 26.

It should be understood that whereas four fingers 14 have been used in the embodiment described above, in alternative embodiments the number of fingers need not be so limited. Any plurality of symetrically disposed fingers will function satisfactorily.

From the preceding description, it is evident that the objects of the invention are attained. Detailed description and illustrations have been presented; however it is to be understood that these are examples and illustrations and are not limitations to the invention. The spirit and scope of this invention are limited only by the terms of the appended claims.

What is claimed:
1. A holder for tubular fabric cutters comprising:
(a) generally cyclindrical base member;
(b) a plurality of generally parallel, radially- and symetrically-disposed, elongated flexible finger members extending coaxially from one end of said base member, and adapted to be moved radially outward into gripping engagement with the internal surface of a tubular fabric cutter for holding the cutter;
(c) a cylindrical first shaft member attached to and coaxial with said base member and extending from the end of said base member opposite to said finger members, whereby said holder may be mounted in a chuck for rotation;
(d) a threaded cylindrical second shaft member attached to and coaxial with said base member and extending coaxially between said finger members;
(e) a frusto-conical plug member mounted coaxially and translatably on said second shaft member between said finger members, and adapted when moved toward said base member to drive the outer portions of said finger members radially outward;
(f) a compression spring surrounding said second shaft member between said plug member and said base member, and adapted when compressed to move said plug member away from said base member thereby permitting the outer portions of said finger members to move radially inward; and
(g) a nut rotatably threaded on said second shaft member adjacent the side of said plug member away from said base member, whereby when said nut is turned in one direction said plug member is moved toward said base member, and when said nut is turned in the other direction said plug member is permitted to move away from said base member.

* * * * *